US012681760B2

(12) United States Patent
Penney et al.

(10) Patent No.: US 12,681,760 B2
(45) Date of Patent: Jul. 14, 2026

(54) DYNAMIC RESOURCE ALLOCATION BASED ON QUALITY-OF-SERVICE PREDICTION

(71) Applicant: Intel Corporation, Santa Clara, CA (US)

(72) Inventors: Drew Penney, Portland, OR (US); Bin Li, Portland, OR (US); Tsung-Yuan Tai, Portland, OR (US); Anna Drewek-Ossowicka, Gdansk (PL); Rameshkumar Illikkal, Folsom, CA (US); Andrew J. Herdrich, Hillsboro, OR (US); Jaroslaw Sydir, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/853,564

(22) Filed: Jun. 29, 2022

(65) Prior Publication Data

US 2022/0326999 A1 Oct. 13, 2022

Related U.S. Application Data

(60) Provisional application No. 63/342,440, filed on May 16, 2022.

(51) Int. Cl.
*G06F 9/50* (2006.01)
(52) U.S. Cl.
CPC ................................. *G06F 9/5027* (2013.01)
(58) Field of Classification Search
None
See application file for complete search history.

(56) References Cited

U.S. PATENT DOCUMENTS 6,556,952 B1    4/2003  Magro
9,274,850 B2 *  3/2016  Gohad .................. G06F 9/5072
(Continued)

FOREIGN PATENT DOCUMENTS

CN        111104210 A     5/2020
CN        113849223 A    12/2021
(Continued)

OTHER PUBLICATIONS

Chen et al.; "Self-adaptive resource allocation for cloud-based software services based on iterative QoS prediction model"; 2019 Elsevier B.V. All rights reserved; https://doi.org/10.1016/j.future. 2019.12.005; (Chen_2019.pdf; pp. 287-296) (Year: 2019).*
(Continued)

*Primary Examiner* — Hiren P Patel
(74) *Attorney, Agent, or Firm* — Nicholson De Vos Webster & Elliott LLP

(57) ABSTRACT

Apparatuses, methods, and systems for dynamic resource allocation based on quality-of-service prediction are disclosed. In embodiments, an apparatus includes quality-of-service prediction circuitry and a resource controller. The quality-of-service prediction circuitry is to make quality-of-service predictions using a model based at least in part on at least one performance counter measurements and at least one quality-of-service measurement. The resource controller is to allocate one or more shared resources based on the quality-of-service predictions and architectural performance counter measurements.

17 Claims, 12 Drawing Sheets

(56) References Cited

U.S. PATENT DOCUMENTS

| | | | | |
|---|---|---|---|---|
| 11,277,317 | B2 * | 3/2022 | Snyder | H04L 41/5003 |
| 11,972,291 | B2 * | 4/2024 | Guim | G06F 11/3024 |
| 12,106,147 | B2 * | 10/2024 | Guo | G06N 3/0442 |
| 12,155,538 | B2 * | 11/2024 | Ganguli | H04L 41/5025 |
| 12,229,589 | B2 * | 2/2025 | Chuang | G06N 3/10 |
| 12,273,279 | B2 * | 4/2025 | Chen | H04L 47/82 |
| 2002/0105911 | A1 * | 8/2002 | Pruthi | H04L 43/0829 |
| | | | | 370/474 |
| 2007/0124274 | A1 * | 5/2007 | Barsness | G06F 16/22 |
| 2010/0262975 | A1 | 10/2010 | Reysa et al. | |
| 2011/0225299 | A1 * | 9/2011 | Nathuji | G06F 9/45558 |
| | | | | 718/1 |
| 2013/0275737 | A1 | 10/2013 | Therien et al. | |
| 2014/0355427 | A1 | 12/2014 | Cheng | |
| 2015/0012634 | A1 * | 1/2015 | Zhu | H04L 67/10 |
| | | | | 709/223 |
| 2015/0185741 | A1 | 7/2015 | Rangarajan et al. | |
| 2016/0239065 | A1 | 8/2016 | Lee et al. | |
| 2017/0131754 | A1 | 5/2017 | Zobel et al. | |
| 2019/0042142 | A1 | 2/2019 | Casmira et al. | |
| 2019/0179757 | A1 | 6/2019 | Walker et al. | |
| 2019/0230046 | A1 | 7/2019 | Djukic et al. | |
| 2020/0311573 | A1 * | 10/2020 | Desai | G06N 7/01 |
| 2021/0044496 | A1 * | 2/2021 | Snyder | H04L 47/821 |
| 2021/0160153 | A1 | 5/2021 | Akman et al. | |
| 2021/0344582 | A1 * | 11/2021 | Samadi | H04L 43/14 |
| 2021/0374848 | A1 * | 12/2021 | Herdrich | G06Q 40/03 |
| 2021/0406075 | A1 | 12/2021 | Illikkal et al. | |
| 2021/0406776 | A1 | 12/2021 | Janulewicz et al. | |
| 2022/0100548 | A1 * | 3/2022 | Ito | H04L 43/0888 |
| 2022/0129031 | A1 * | 4/2022 | Srinivasan | G06F 1/3203 |

FOREIGN PATENT DOCUMENTS

| | | |
|---|---|---|
| EP | 3929746 A1 | 12/2021 |
| JP | 2016-503911 A | 2/2016 |
| KR | 10-2022-0001418 | 1/2022 |
| TW | 201337537 A | 9/2013 |
| TW | 201531853 A | 8/2015 |
| TW | 201640273 A | 11/2016 |
| TW | 201716926 A | 5/2017 |
| TW | 201730715 A | 9/2017 |

OTHER PUBLICATIONS

Chen et al.; Resource Allocation for Cloud-Based Software Services Using Prediction-Enabled Feedback Control With Reinforcement Learning; IEEE Transactions on Cloud Computing, vol. 10, No. 2, Apr.-Jun. 2022; DOI: 10.1109/TCC.2020.2992537; (Chen_2022. pdf, pp. 1117-1129) (Year: 2022).*

Xing Chen et al.; "Resource Allocation With Workload-Time Windows for Cloud-Based Software Services: A Deep Reinforcement Learning Approach"; © 2022 IEEE; DOI: 10.1109/TCC.2022. 3169157 (XingChen_2022.pdf; pp. 1871-1885) (Year: 2022).*

Final Office Action, U.S. Appl. No. 16/914,305, Feb. 27, 2024, 45 pages.

Notice of Allowance , TW App. No. 109145720, Apr. 22, 2024, 03 pages (01 page of English Translation and 02 pages of Original Document).

Notice of Allowance, U.S. Appl. No. 16/914,305, Nov. 6, 2024, 2 pages.

Final Office Action, U.S. Appl. No. 16/816,779, Dec. 12, 2022, 7 pages.

Examination Report No. 1, AU App. No. 2020294205, Oct. 10, 2024, 4 pages.

Office Action, MY App. No. PI2020006360, Sep. 6, 2024, 5 pages.

Office Action, EP App. No. 20209776.2, Apr. 17, 2023, 9 pages.

Office Action, AU App. No. 2020294205, Feb. 19, 2025, 03 pages.

Office Action, TW App. No. 109145720, Jan. 31, 2024, 07 pages (4 pages of English Translation and 3 pages of Original Document).

Kuriata et al., "Predictable Performance for QoS-Sensitive, Scalable, Multi-tenant Function-as-a-Service Deployments", 2020, 8 pages.

Zuckerman, Moshe, "Introduction to Queueing Theory and Stochastic Teletraffic Models", arXiv:1307.2968v1, Jul. 11, 2013, 225 pages.

Hearing Notice , IN App. No. 202044053737, Jul. 8, 2024, 2 pages.

Notice of Allowance, U.S. Appl. No. 16/816,779, Mar. 29, 2023, 10 pages.

Notice of Allowance, U.S. Appl. No. 16/914,305, Oct. 1, 2024, 20 pages.

Office Action, ID App. No. P-00202010144, Dec. 13, 2023, 6 pages (4 pages of English Translation and 2 pages of Original Document).

Ejarque et al., "SLA-Driven Semantically-Enhanced Dynamic Resource Allocator for Virtualized Service Providers", Fourth IEEE International Conference on eScience, 2008, pp. 8-15.

European Search Report and Search Opinion, EP App. No. 20209776. 2, Apr. 22, 2021, 11 pages.

Examination Report, IN App. No. 202044053737, Mar. 23, 2022, 6 pages.

H., Andrew, et al., "Introduction to Memory Bandwidth Allocation", https://software.intel.com/en-us/articles/introduction-to-memory-bandwidth-allocation, published Mar. 12, 2019, downloaded Jan. 28, 2020, 10 pages.

Hiremath, et al., "Telco/Cloud Enablement for 2nd Generation Intel Xeon Scalable platform, Intel Resource Director Technology", Application Note Intel Corporation, https://networkbuilders.intel. com/solutionslibrary/telco-cloud-enablement-for-2nd-generation-intel-xeon-scalable-platform-intel-resource-director-technology#.XI_ YuTsZhE, Apr. 2, 2019, 14 pages.

Intel Corporation, "Are Noisy Neighbors in Your Data Center Keeping You Up at Night?", https://www.intel.com.tr/content/dam/ www/public/us/en/documents/white-papers/intel-rdt-infrastructure-paper.pdf, (Copyrights) 2017 Intel Corporation, downloaded Mar. 4, 2020, 45 pages.

Intel Resource Director Technology (Intel RDT), "Unlock System Performance in Dynamic Environments", https://www.intel.com/ content/www/us/en/architecture-and-technology/resource-director-technology.html, downloaded Mar. 4, 2020, 7 pages.

Non-Final Office Action, U.S. Appl. No. 16/816,779, May 26, 2022, 19 pages.

Barrett et al. Applying reinforcement learning towards automating resource allocation and application scalability in the cloud, May 30, 2012, Retrieved from <URL:https://onlinelibrary.wiley.com/doi/ epdf/10.1002/cpe.2864>, pp. 1656-1674 (Year: 2012).

Non-Final Office Action, U.S. Appl. No. 16/914,305, Aug. 17, 2023, 36 pages.

Vakilinia et al. Preemptive cloud resource allocation modeling of processing jobs, Jan. 11, 2018, Retrieved from <URL:https://link. springer.com/content/pdf/10.1007/s11227-017-2226-0.pdf?pdf= button%20sticky>, pp. 2116-2150 (Year: 2018).

Shahin et al., "Preemptive cloud resource allocation modeling of processing jobs", The Journal of Supercomputing, May 2018, 14 pages.

* cited by examiner

200

PROCESSOR 600

DYNAMIC RESOURCE ALLOCATION BASED ON QUALITY-OF-SERVICE PREDICTION

BACKGROUND

Description of the Related Art

Quality of service is an important mechanism to enforce the priority-based fairness in computer systems and may be implemented with allocations of various shared resources. Quality of service hooks are used today in caches, memory subsystem queues, memory controllers, and fabric cards.

Intel® Resource Director Technology® (RDT) provides the capability to control the manner in which shared resources such as last-level caches (LLCs) and memory bandwidth are used by applications, virtual machines (VMs), and containers. RDT helps in workload consolidation, performance consistency, and dynamic service delivery, helping driving efficiency and flexibility across the data center and networking domain while reducing overall total cost of ownership (TCO).

BRIEF DESCRIPTION OF THE DRAWINGS

A better understanding of the present invention may be obtained from the following detailed description in conjunction with the following drawings, in which.

DETAILED DESCRIPTION

Figure 1A:
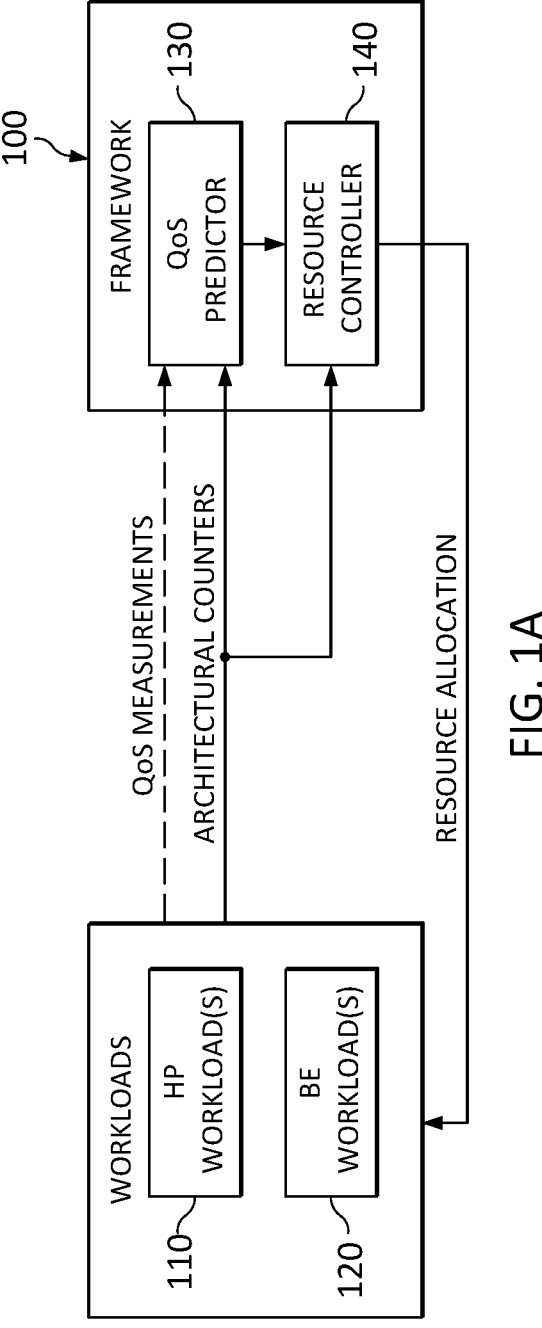
FIG. 1A illustrates a high-level design of a dynamic resource allocation framework according to embodiments.

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

In modern processor design, a multi-core processor architecture has shared resources such as memory bandwidth, interconnect bandwidth including last-level cache (LLC), processing threads, input/output (I/O) devices, etc. Application performance may become highly unpredictable due to access contention of the shared resources from "noisy neighbor" applications.

Some processors include a technology called Resource Director Technology (RDT), commercially available from Intel Corporation, that enables levels of visibility and control over how shared system resources such as LLC and memory bandwidth are being used by different applications executing on the processor, as described below. Low priority applications may be prevented from accessing shared resources if they exceed a quota which is monitored by the RDT technology.

High-priority, latency-sensitive workloads often do not fully utilize all system resources, especially when workload demand falls below the peak. As such, service providers often attempt to increase overall system resource utilization by opportunistically co-scheduling additional best-effort workloads on the same physical system. This practice, however, may introduce contention on shared resources and thereby increases the likelihood of service-level agreement (SLA) violations. Furthermore, the effects of this resource contention may vary over time along with changes in workload demand, both for the high-priority and best-effort workloads. Therefore, embodiments may provide practical co-scheduling to dynamically allocate resources that may avoid SLA violations while optimizing resource utilization.

Static allocation (based on peak load or historic load behavior): A conventional approach involves static allocation, in which high-priority workloads with strict quality of service (QoS) requests/requirements are given sufficient resources to accommodate peak workload demand while all remaining resources are allocated to best-effort workloads (e.g., those without strict performance requests/requirements). In practice, this approach is often highly inefficient since average workload demand may fall substantially below peak demand.

Demands for server resources (e.g., compute, memory, network) may vary significantly over time for both high-priority and best-effort workloads. Static resource allocation methods based on peak load therefore tend to significantly underutilize resources and waste opportunities to achieve higher best-effort workload performance, higher power efficiency, etc. Further, in a public cloud environment, prior knowledge of workload behaviors typically may not be assumed and when peak demand occurs may not be known, so an appropriate static resource allocation may not be determinable.

Search-based methods (hill-climbing and Bayesian Optimization): Search-based methods attempt to directly determine appropriate resource allocations by trying a variety of configurations options and then selecting the configuration that was determined to be most optimal. These methods often might not react quickly to changes in workload demand since the search procedure is repeated to determine a new resource allocation.

Search-based methods generally do not perform well in highly dynamic operating environments since the previously determined resource allocation may remain optimal for a short period. Determining a new resource allocation involves repeating the search procedure and re-exploring a variety of resource allocation options, some of which may cause SLA violations. These search procedures also do not scale well with the number of resources and workloads so may fail to determine appropriate resource allocation configurations in some scenarios.

Control-theory-based methods: Proportional-integration-derivative (PID) controllers have been used to achieve highly dynamic resource allocation. These controllers continuously measure quality-of-service or some proxy and compare those measurements with a pre-determined target. The difference between these two values is then used to determine how many more resources should be given to the high-priority workload or removed from the best-effort workload.

Resource allocation methods based on PID controllers are fundamentally reactive so may not be able to appropriately respond to rapid changes in resource demands. Furthermore, PID controllers might tune only one resource (e.g., one control knob) so might not achieve optimal system utilization in all scenarios.

Reinforcement-learning: Control methods based on reinforcement-learning are a fundamentally different approach in which a policy for resource allocation is learned based on past experience (e.g., previous resource allocation decisions and the resulting quality-of-service that was achieved). Given sufficient past experience, these models may learn to proactively avoid SLA violations, rather than simply reacting once an SLA violation has occurred.

A possible limitation with reinforcement learning methods is the total time to learn an appropriate resource allocation policy, often on the order of hours. Learning this policy in a production environment (e.g., online) is usually impractical since the exploration may cause SLA violations, similar to search-based methods. Learning this policy in a test environment (e.g., offline) is also problematic since we may not always assume prior information of workloads or their behaviors. As such, the learned policy may not generalize well to the production environment and cause SLA violations. In practice, reinforcement learning methods have typically been limited to private cloud environments with knowledge of workloads and with training time amortized by running a particular workload for an extended period (e.g., weeks or more).

Dynamic Resource Allocation Based on Proactive Quality of Service Prediction

Embodiments may provide an adaptive framework for resource allocation that may be applied to highly dynamic operating environments (e.g., public cloud), might not require any prior knowledge of workloads, and might not make any assumptions regarding the relationship between workload QoS and system-level performance measurements. This highly adaptive framework may use a model (e.g., as described below) to predict QoS and provide near-instantaneous feedback on resource allocation decisions, thereby enabling practical online application of reinforcement learning.

As discussed above, reinforcement-learning-based resource allocation is typically not practical in operating environments that use online learning. Embodiments may provide a framework that mitigates this problem using a specialized QoS prediction model that may provide near-instantaneous feedback on resource allocation actions, thus greatly reducing the time to learn an appropriate resource allocation policy. Consequently, a framework according to embodiments may reliably exploit the advantages of reinforcement learning in any operating environment, which may provide for:

learning fine-grained resource allocation policies that exploit brief periods with low workload demand and proactively avoid QoS violations during periods with high workload demand jointly optimizing any number of resources (e.g., cache, memory, core frequency) to better utilize system resources adapting to specific customer requests/requirements (e.g., whether to optimize performance or power efficiency, strictness of SLA requests/requirements, etc.)

FIG. 1A illustrates a high-level design of a dynamic resource allocation framework 100 according to embodiments. In embodiments, hardware of framework 100 may be implemented in logic gates, memory cells, and/or any other circuitry or hardware in or accessible by a CPU, processor, or core (e.g., core 490 in FIG. 4B, processor 600 in FIG. 6, processors 710 or 715 in FIG. 7, processors 870 or 880 in FIG. 8 or 9, application processor 1010 in FIG. 10) and any number of them may be integrated into a single chip or system-on-chip (SoC) or distributed across any number of chips, chiplets, modules, packages, etc.

Figure 1B:
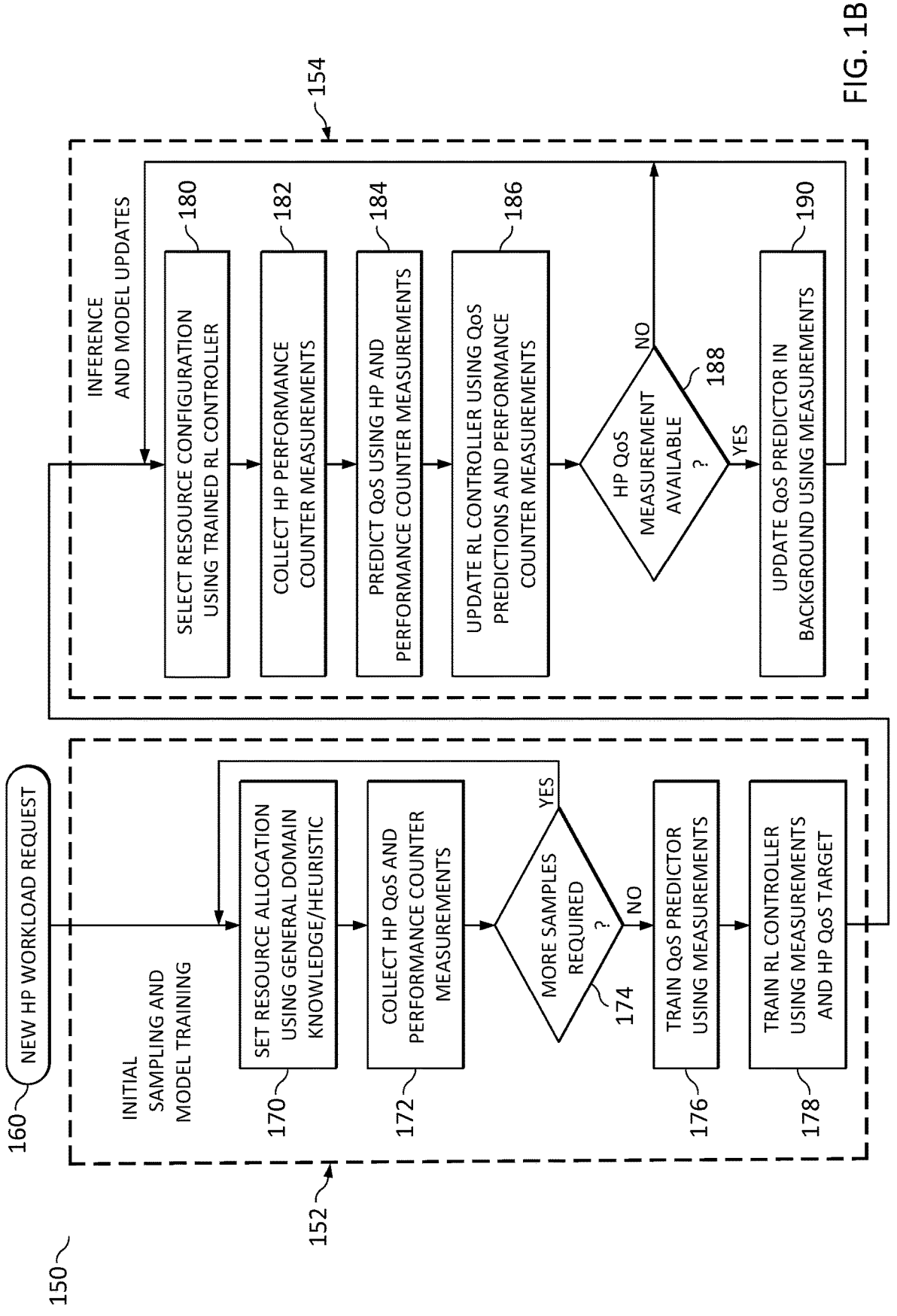
FIG. 1B illustrates a flowchart of a method of operation of a dynamic resource allocation framework according to embodiments.

FIG. 1B, described below together with the description of FIG. 1A, illustrates a flowchart of a method 150 of operation of a dynamic resource allocation framework, such as framework 100, according to embodiments. Method 150 includes two phases, phase 152 for initial sampling and model training and phase 154 for inference and model updates.

In 160, framework execution may begin upon receiving a new high-priority (HP) workload 110 to be co-scheduled with one or more best-effort workload 120 on a compute node. In general, this high-priority workload 110 might be previously unseen and prior information about workload behaviors might not be required; therefore, in 170, resource allocation(s) may be set using general domain knowledge and/or a heuristic. In 172, one or more resource allocation(s) (e.g., as set in 170) are sampled by collecting QoS and performance counter measurements (e.g., counts or measurements collected by performance or other counters or monitors).

In this initial sampling period, training examples, samples, measurements, etc. for a QoS predictor 130 (based on supervised learning) may be gathered. In an embodiment, the framework samples each of the initial resource allocations for approximately 5-10 seconds while measuring several architectural counters (e.g., performance or other counters or monitors) and Quality-of-Service (QoS) for the high-priority workload 110 via a software interface. These measurements may be averaged over the entire 5-10 second period to reduce the effects of any transient workload behaviors (see below for details).

In 174, a decision may be made to collect more samples.

In 176, the QoS predictor 130 is trained, with each of these initial samples, to predict the measured QoS based on architectural counter measurements (e.g., counts or measurements collected by performance or other counters or monitors). In 178, these samples may also be used to begin training the reinforcement-learning (RL) controller 140 (may also be referred to as resource controller 140), although additional samples may still be gathered and used.

After the initial sampling period 152, the resource controller 140 is trained and makes further resource allocation decisions in phase 154. Feedback on these decisions is provided not by QoS measurements but instead by the QoS predictor 130. As such, the information used by the primary control loop might be from architectural counters (e.g., performance or other counters or monitors), which tend to be far more stable than QoS measurements. Consequently, resource allocation decisions may be made much faster than would be possible with QoS measurement alone. QoS predictor accuracy may be continuously improved by accumulating training examples (e.g., architectural counter measurements and QoS measurements) in the background, separate from the primary control loop, thereby accommodating online learning in highly dynamic operating environments.

In 180, a resource configuration is selected using trained RL controller 140. In 182, additional performance counter measurements may be collected, e.g., during execution of the high-performance workload. In 184, QoS may be predicted using performance counter measurements. In 186, RL controller 140 may be updated using the QoS predictions and performance counter measurements. In 188, a decision may be made as to whether a HP QoS measurement is available. If not, method 150 returns to 180; if so, method 150 continues to 190.

In 190, QoS predictor 130 is updated in the background using the collected measurements.

The following example highlights the difference in runtime behavior between a conventional approach and a framework according to embodiments. Here, assume that 360 samples are collected for a reinforcement learning controller to learn an appropriate resource allocation policy. A conventional approach may average QoS measurements over roughly five seconds for each of the 360 samples, for a total of thirty minutes of sampling time. Instead, a framework according to embodiments uses the comparatively easy-to-train QoS prediction model to predict the QoS that will result from the current resource allocation (based on architectural counter information). Therefore, twenty samples at five seconds (for example) per sample (to train the QoS predictor) may be used, after which the remaining 340 samples may be generated at a 0.1 second interval (for example), reducing total learning time to just over two minutes (for example), over an order of magnitude faster than the conventional approach.

Figure 2:
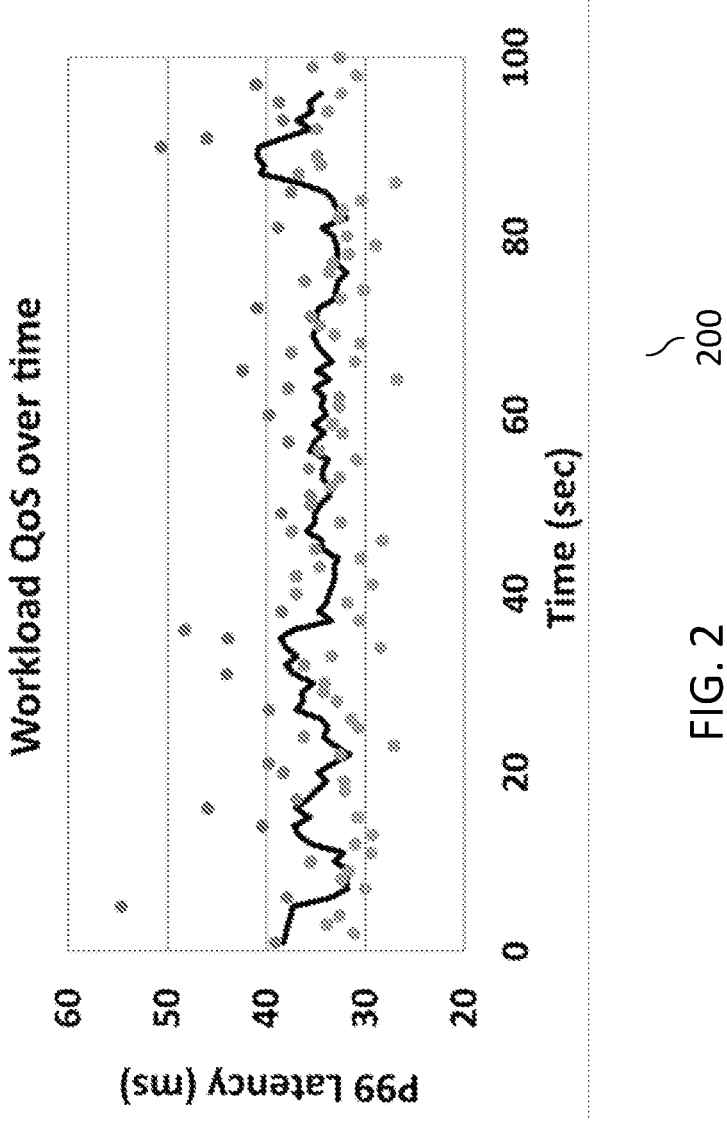
FIG. 2 illustrates quality-of-service fluctuations when co-scheduling one high-performance workload and one best-effort workload.

A possible limitation in existing reinforcement-learning-based resource allocation methods might be dependence upon QoS measurements. In practice, QoS measurements may fluctuate substantially over time due to contention for shared resources caused by other workloads executing on the same compute node. As an example, FIG. 2 shows results of experiments in which one high-priority workload was co-scheduled with one best-effort workload while keeping all controllable factors constant (e.g., user request rate for the high-priority workload, number of cores for the best-effort workload, last-level cache allocation, memory bandwidth allocation, core frequency, and uncore frequency). Here, high-priority workload QoS is calculated as the P99 latency over all completed requests returned to the client during each one-second interval. As shown below, QoS measurements at a one-second interval may vary by approximately 100% compared to the long-term average. Even five-second averages (solid line) may fluctuate by roughly 30% for the tested workloads. As such, a 5-10 second QoS measurement interval may be necessary to determine appropriate feedback for a resource allocation decision.

Embodiments may leverage one or more insights to address these challenges. First, architectural counters are strongly correlated with long-term workload performance while being much more consistent than QoS measurements (up to two orders-of-magnitude lower relative standard deviation). In other words, when the measurement period is relatively small, it may be possible to more accurately estimate whether a QoS target will be met based on architectural counters instead of direct QoS measurements. Second, QoS prediction enables embodiments to use a much smaller resource allocation decision interval. As a result, it becomes feasible to train a resource allocation controller online. Furthermore, the controller may learn to exploit brief periods with lower workload demand that would otherwise be missed when making resource allocation decisions at a multi-second interval.

Details of Framework Implementation According to Embodiments

QoS Prediction

QoS prediction is used in embodiments to provide fast feedback on resource allocation decisions (e.g., whether the selected resource allocation could cause a QoS violation). Input to the QoS predictor is a small set of architectural counters determined via offline profiling and feature selection. At runtime, measurements for each of these counters are aggregated across high-priority workload cores at the desired interval and then delivered to the QoS predictor. The model then predicts the QoS metric for each high-priority workload, which is compared to the target QoS specified by the customer.

Model: The relationship between QoS and architectural counters, although roughly linear, may be more accurately modeled by complex, non-linear models. These non-linear models, however, are more prone to catastrophic overfitting when training samples are limited. As a compromise, a relatively low-complexity approach based on support vector regression with a radial basis function may be adopted. This model, although non-linear, may be made to learn relatively smooth decision boundaries and, in experiments, consistently outperformed linear models even when trained on just twenty samples. Any other machine learning regression model could be used and may perform better in some situations (e.g., if there is prior knowledge of workload behaviors).

Reducing QoS Prediction Sampling: Embodiments may integrate several strategies to reduce the number of initial samples to train the QoS predictor. First, resource allocation may be restricted to an efficient subset that has the greatest impact on performance/power while still being able to satisfactorily mitigate resource contention, regardless of workload demands. Therefore, embodiments may use memory bandwidth, which may mitigate most resource contention, and core frequency, which may be used to improve power-efficiency or performance. Allocating additional resources may provide relatively low benefit for tested workloads but could provide benefit in other co-scheduling scenarios. In embodiments, granularity of resource allocation steps may be reduced (e.g., allocate core frequency in 200 MHz steps rather than 100 MHz steps). Even with this change, fine-grained resource allocation behaviors may still be mimicked by rapidly alternating between adjacent configurations (e.g., mimic core frequency allocation of 2.7 GHz by alternating between 2.6 GHz and 2.8 GHz). Finally, to avoid simple random sampling when gathering QoS prediction data due to the inherent bias that may occur with limited samples, general domain knowledge may be leveraged, and focus may be on sampling resource allocations that may be most likely to cause changes in resource contention and workload performance.

Resource Allocation Controller

Figure 3:
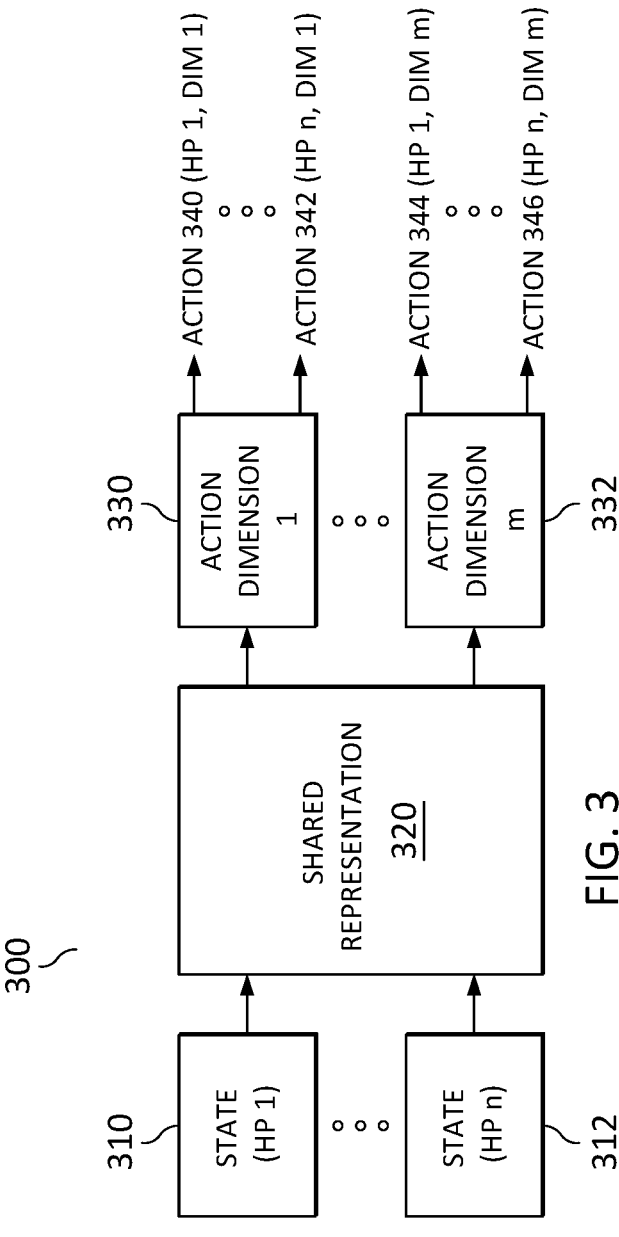
FIG. 3 illustrates a model for a resource allocation controller according to embodiments.

Model: The resource allocation controller in embodiments may be implemented as a deep reinforcement learning model. Any of a variety of models could potentially be used. One example is the action-branching architecture 300 illustrated in FIG. 3. With this approach, the allocation for each resource is determined by a separate output branch (e.g., actions 340, 342, 344, 346). Coordination between action spaces is maintained by a shared decision module 320 prior to one or more split action dimensions (e.g., 330, 332).

State Specification: For state specification (e.g., 310, 312), embodiments may re-use the high-priority workload architectural counters from QoS prediction as the primary input information for the resource allocation controller. Embodiments could also use best-effort workload counters, as desired, to provide additional information about potential resource contention.

Action Specification: Since a fixed set of workloads may not be assumed, reinforcement learning may be used to select the high-priority workload resource allocation. Resource allocation for the best-effort workload(s) may then be determined indirectly based on the high-priority workload resource allocation. Specification for each resource may be as follows:

Memory bandwidth actions a_MBW specify the degree of restriction, with possible values ranging from 0-90%. The best-effort memory bandwidth restriction is then given as 100–a_MBW. Optionally, the high-priority workload may be left unrestricted if it has low memory bandwidth usage or is the only high-priority workload being executed.

Core frequency actions a_CF are specified based on platform-specific capabilities (e.g., n-core turbo limits). Higher values for a_CF (high-priority core frequency) therefore correspond to lower values for best-effort core frequency.

Reward Specification: Rewards may be used to encourage resource allocation decisions that align with customer-defined goals (e.g., power efficiency) while avoiding QoS violations.

Negative rewards penalize resource allocation decisions that cause QoS violations, either during initial sampling when using QoS measurements (Equation 1 below) or during regular operation when using QoS predictions (Equation 2 below).

$$r_- = -\min\left(\log\left(\frac{qos_{measured}}{qos_{target}}\right), \beta\right) \qquad (1)$$

$$r_- = -\min\left(\log\left(avg\left(\frac{prob_{violation}}{prob_{no\_violation}}\right)\right), \beta\right) \qquad (2)$$

These penalties may be clipped at $\beta=2$ to improve learning stability in situations where severe violations occur. In embodiments, it may be possible to predict that a QoS could occur but not actually cause a violation (often defined over a multi-second period) since an improper resource allocation decision may be quickly corrected. Embodiments may accommodate this scenario using a windowed average over QoS predictions, thereby making better use of actual QoS slack.

Positive rewards may be given when no QoS violation is detected/predicted. A positive reward may be highly general and may be adapted to specific customer requests/requirements (e.g., prioritize performance, power efficiency, etc.). As an example, the formulation shown below (Equation 3) prioritizes best-effort performance by giving higher rewards for higher best-effort resource allocation. Then, $\gamma$ may be used prioritize specific resources, as desired, based on general domain knowledge or any prior knowledge of best-effort workload demands.

$$r_+ = \gamma = BE_{CF} + (1-\gamma)*BE_{MBW} \qquad (3)$$

Exploration: An online learning scenario may render exploration a potentially dangerous task because randomly chosen resource allocations may lead to severe QoS violations and also delay further exploration since BE workloads are strictly throttled while any backlogged requests are processed. As a compromise, actions may be based on a discrete probability distribution around the current greedy action. Given exploration probability $\epsilon$ and a greedy action index of n the offset from the greedy action is given (Equation 4) as $$o_t = \left\{ -\frac{\epsilon}{2n}, \dots, -\frac{\epsilon}{2n}, 1-\epsilon, \frac{\epsilon}{2} \right\} \qquad (4)$$

Rather than using a uniform distribution or Gaussian distribution, embodiments may strictly clip the maximum offset to be +1. This clipping accounts for the presence of QoS cliffs, in which a single resource allocation step may cause orders-of-magnitude degradation in QoS. Adopting this strict clipping also allows a high exploration probability to be maintained throughout operation, thus supporting life-long exploration.

In embodiments, a highly flexible framework for dynamic resource allocation may provide strong QoS guarantees for high-priority workloads while greatly improving best-effort workload performance. This framework leverages machine learning to directly predict QoS, thereby allowing proactive resource allocation at a much finer granularity than is possible in most prior work. Further, this QoS prediction mechanism may eliminate the need for any assumptions about the relationship between workload performance and commonly available performance counters, which may be a limitation in PID-based controllers. Resource allocation decisions, made by a deep reinforcement learning controller, may be made for any number of resources and may adapt to specific user-defined goals, such as performance versus power-efficiency. Overall, these elements allow embodiments to be a competitive option for resource allocation even in highly dynamic operating environments such as a public cloud.

Monitoring and Allocation of Shared Resources

Resource Director Technology (RDT), commercially available from Intel Corporation, provides a framework for cache and memory monitoring and allocation capabilities in a processor, including cache monitoring technology (CMT), cache allocation technology (CAT), code and data prioritization (CDP), memory bandwidth monitoring (MBM), and memory bandwidth allocation (MBA). These technologies enable tracking and control of shared resources, such as last-level cache (LLC) and primary memory bandwidth in use by applications and/or virtual machine (VMs) running on a computing platform concurrently. RDT may aid noisy neighbor detection and help to reduce performance interference, ensuring the performance of key workloads in complex computing environments meets QoS requests/requirements.

Cache Allocation Technology (CAT) provides software-programmable control over the amount of cache space that may be consumed by a given thread, application, VM, or container. This allows, for example, OSs to protect important processes, or hypervisors to prioritize important VMs even in a noisy datacenter environment. The basic mechanisms of CAT include the ability to enumerate the CAT capability and the associated last-level cache (LLC) allocation support via CPUID, and the interfaces for the OS/hypervisor to group applications into classes of service (CLOS) and indicate the amount of last-level cache available to each CLOS. These interfaces are based on Model-Specific Registers (MSRs). As software enabling support is provided, most users may leverage existing software patches and tools to use CAT.

The CMT feature provides visibility into shared platform resource utilization (via L3 cache occupancy), which enables improve application profiling, better scheduling, improved determinism, and improved platform visibility to track down applications which may be over-utilizing shared resources and thus reducing the performance of other co-running applications. CMT exposes cache consumption details, which allows resource orchestration software to ensure better Service Level Agreement (SLA) attainment.

MBA technology enables approximate and indirect control over the memory bandwidth available to workloads, enabling interference mitigation and bandwidth shaping for noisy neighbors present in computing platform. MBA provides per-core controls over bandwidth allocation. MBA is included between each core and a shared high-speed interconnect which connects the cores in some multi-core processors. This enables bandwidth downstream of shared resources, such as memory bandwidth, to be controlled. MBA is complementary to existing RDT features such as CAT. For instance, CAT may be used to control the last-level cache, while MBA may be used to control memory bandwidth. The MBA feature extends the shared resource control infrastructure introduced with CAT. The CAT architecture defines a per-software-thread tag called a Class of Service (CLOS), which enables running threads, applications or VMs to be mapped to a particular bandwidth. Through central processing unit (CPU) identifier (CPUID)-based enumeration, the presence of the MBA feature may be confirmed on a specific processor. Once enumerated as present, details such as the number of supported classes of service and MBA feature specifics such as throttling modes supported may be enumerated.

In typical usages an enabled OS or VMM will maintain an association of processing threads to a CLOS. Typically, when a software thread is swapped onto a given logical processor, a model specific register (MSR) such as IA32_PQR_ASSOC MSR (for an Intel Corporation Xeon® processor, for example) is updated to reflect the CLOS of the thread. MBA bandwidth limits per-CLOS are specified as a value in the range of zero to a maximum supported level of throttling for the platform (available via CPUID), typically up to 90% throttling, and typically in 10% steps. These steps are approximate, and represent a calibrated value mapped to a known bandwidth-intense series of applications to provide bandwidth control. The resulting bandwidth for these calibration points provided may vary across system configurations, generations and memory configurations, so the MBA throttling delay values should be regarded as a hint from software to hardware about how much throttling should be applied.

Exemplary Processor Architectures

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

Figures 4A, 4B:
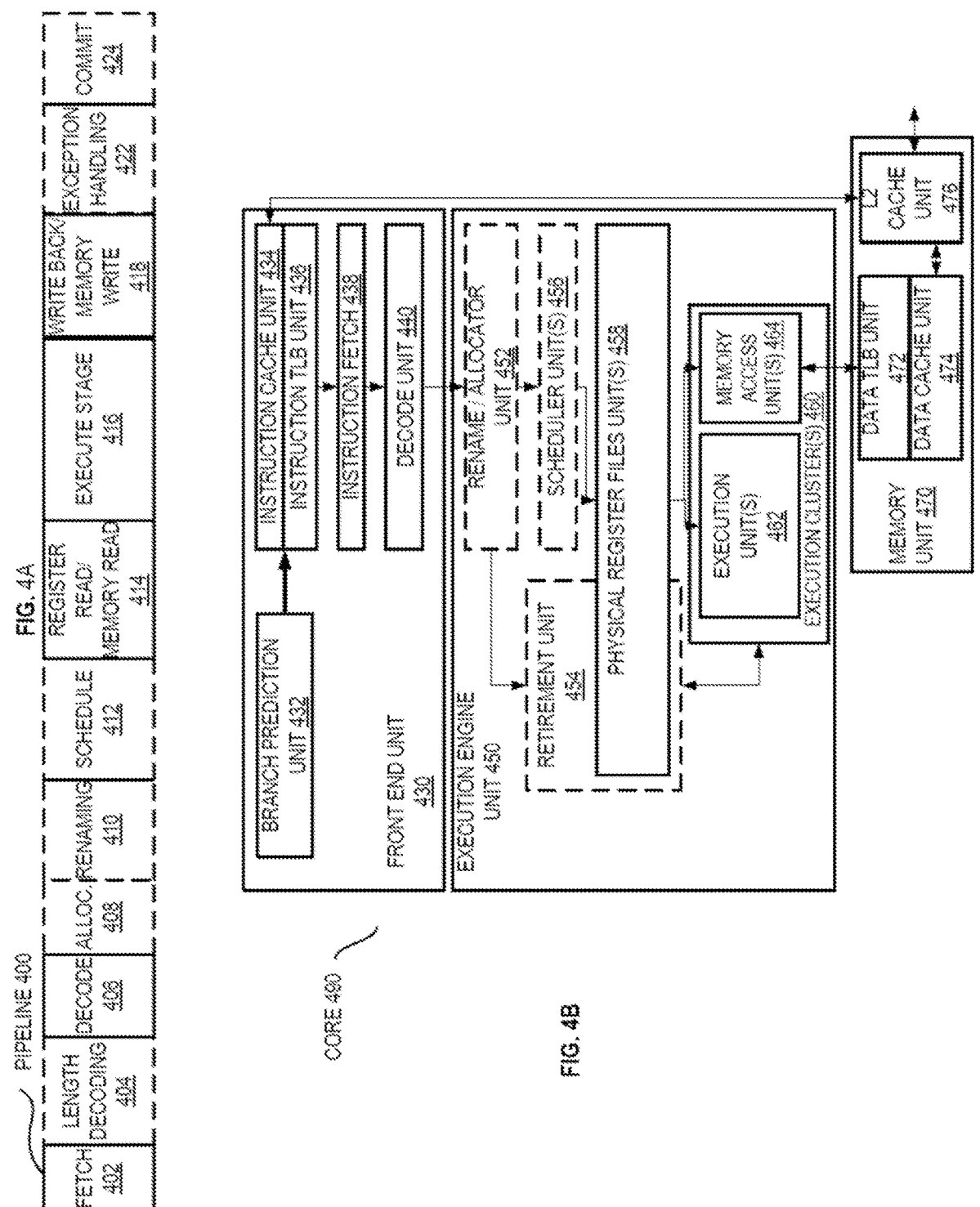
FIG. 4A is a block diagram illustrating both an exemplary in-order fetch, decode, retire pipeline and an exemplary register renaming, out-of-order issue/execution pipeline according to embodiments.
FIG. 4B is a block diagram illustrating both an exemplary embodiment of an in-order fetch, decode, retire core and an exemplary register renaming, out-of-order issue/execution architecture core to be included in a processor according to embodiments.

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front-end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front-end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front-end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit and a scalar registers unit. These register units may provide architectural vector registers, vector mask registers, and general-purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

US 12,681,760 B2

13

Specific Exemplary In-Order Core Architecture

Figures 5A, 5B:
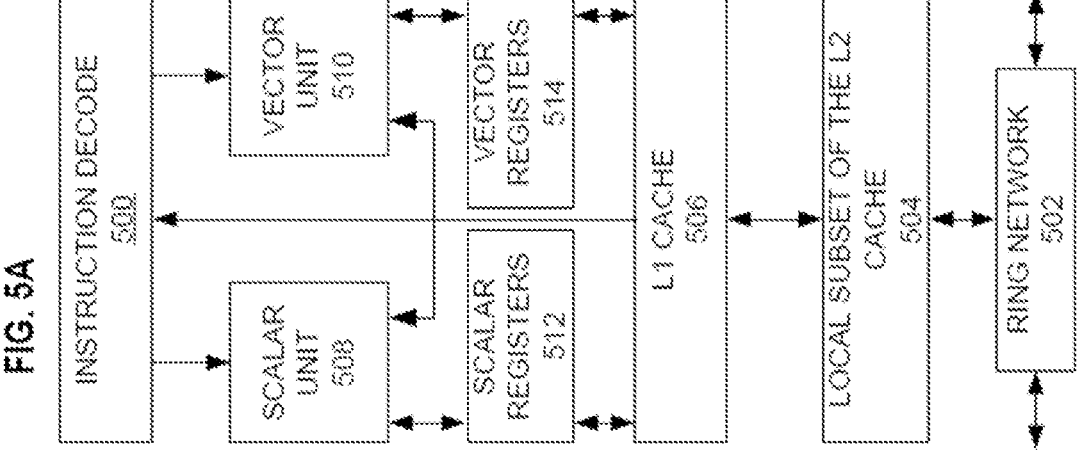
FIG. 5A is a block diagram of a single processor core, along with its connection to an on-die interconnect network.
FIG. 5B illustrates an expanded view of part of the processor core in FIG. 5A according to embodiments.

FIGS. 5A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the invention. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the invention may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and may be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 5B is an expanded view of part of the processor core in FIG. 5A according to embodiments of the invention. FIG. 5B includes an L1 data cache 506A part of the L1 cache 504, as well as more detail regarding the vector unit 510 and the vector registers 514. Specifically, the vector unit 510 is a 6-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input.

Processor with Integrated Memory Controller and Graphics

Figure 6:
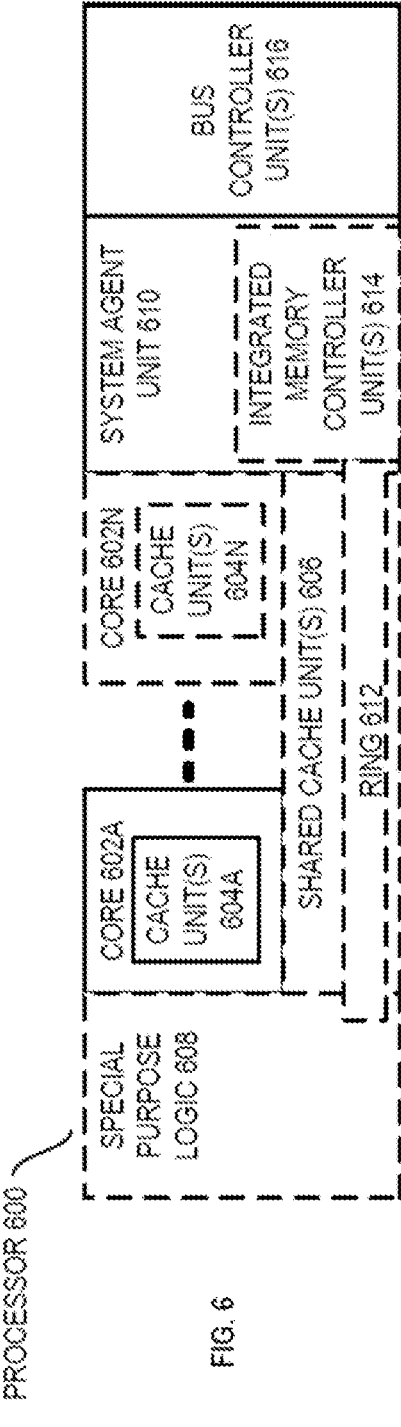
FIG. 6 is a block diagram of a single core processor and a multicore processor with integrated memory controller and graphics according to embodiments.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (through-put); and 3) a coprocessor with the cores 602A-N being a large number of general purpose in-order cores. Thus, the processor 600 may be a general-purpose processor, copro-cessor or special-purpose processor, such as, for example, a network or communication processor, compression engine, graphics processor, GPGPU (general purpose graphics pro-cessing unit), a high-throughput many integrated core (MIC) coprocessor (including 30 or more cores), embedded pro-cessor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores 604A-N, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring-based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

Exemplary Computer Architectures

FIGS. 7-10 are block diagrams of exemplary computer architectures. Other system designs and configurations known in the arts for laptops, desktops, handheld PCs, personal digital assistants, engineering workstations, serv-ers, network devices, network hubs, switches, embedded processors, digital signal processors (DSPs), graphics devices, video game devices, set-top boxes, micro control-lers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
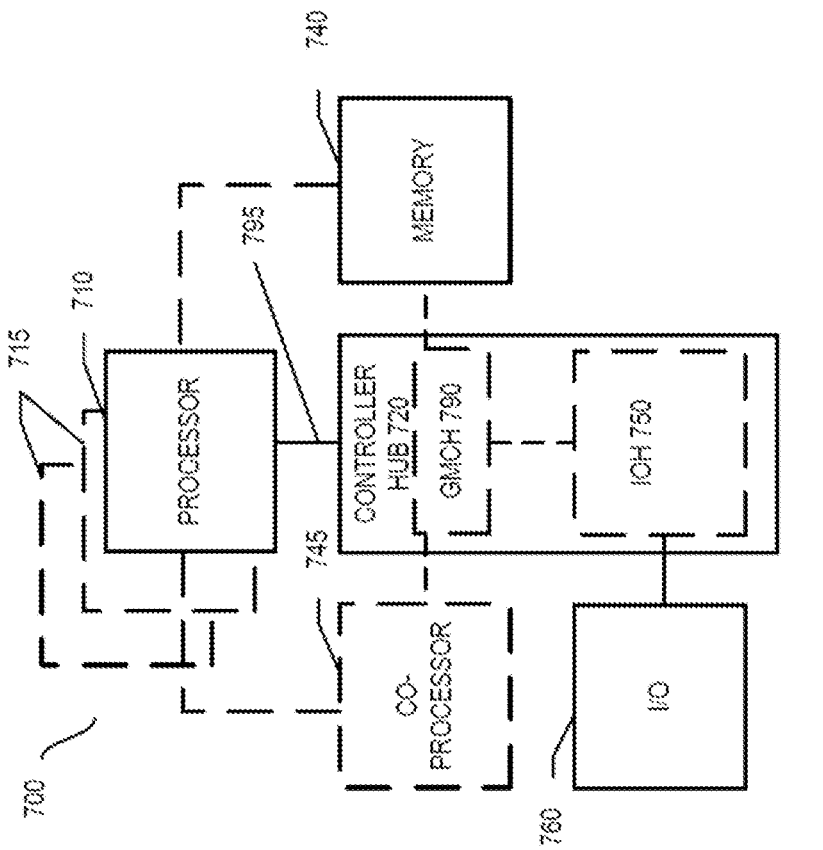
FIG. 7 illustrates a block diagram of a system in accordance with one embodiment.

Referring now to FIG. 7, shown is a block diagram of a system 700 in accordance with one embodiment of the present invention. The system 700 may include one or more processors 710, 715, which are coupled to a controller hub 720. In one embodiment, the controller hub 720 includes a graphics memory controller hub (GMCH) 790 and an Input/

Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random-access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface, or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There may be a variety of differences between the physical resources 710, 7155 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
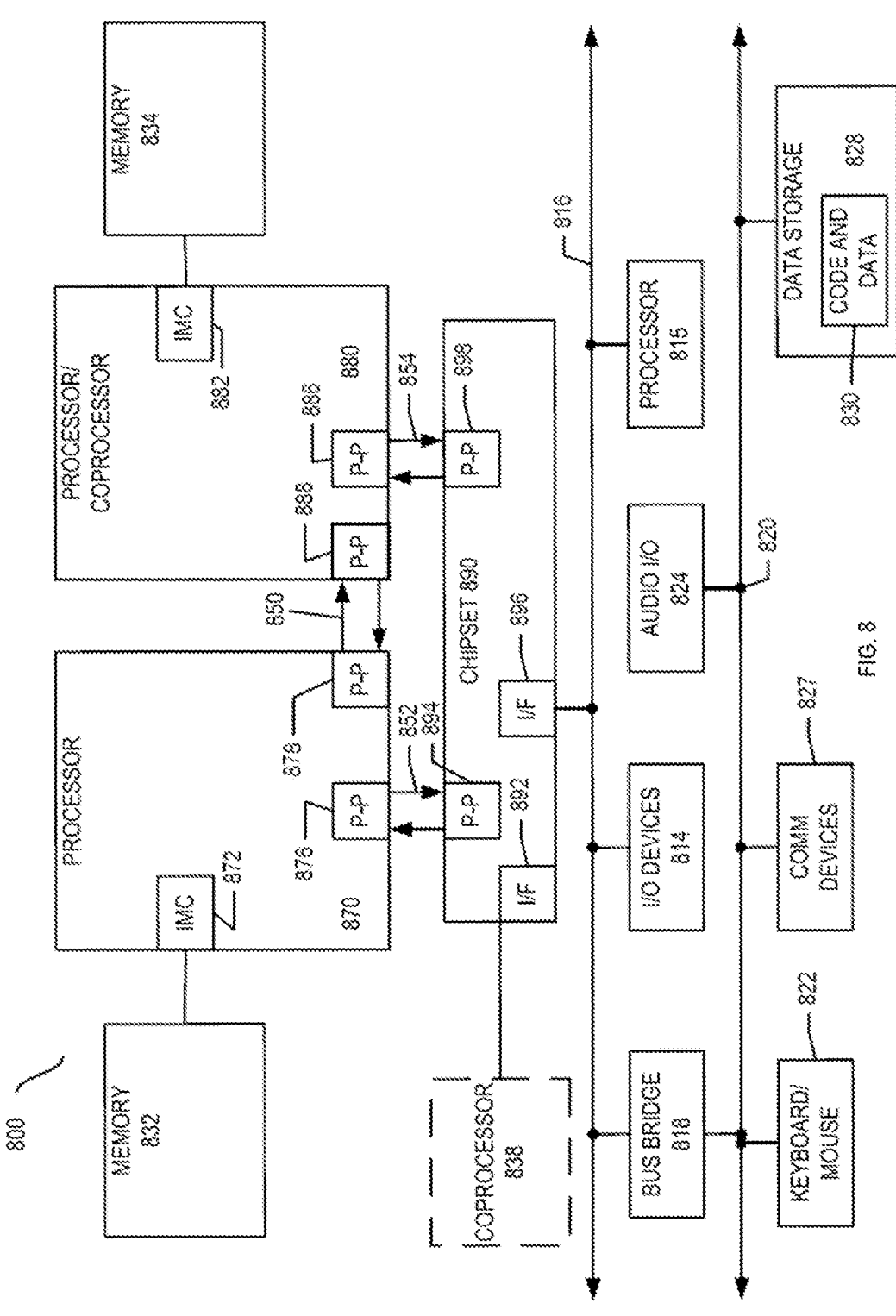
FIG. 8 illustrates a block diagram of a second system in accordance with an embodiment.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller unit's point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset

890 may optionally exchange information with the coprocessor 838 via a high-performance interface 892. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 816. Note that other architectures are possible. For example, instead of the point-to-point architecture of FIG. 8, a system may implement a multi-drop bus or other such architecture.

Figure 9:
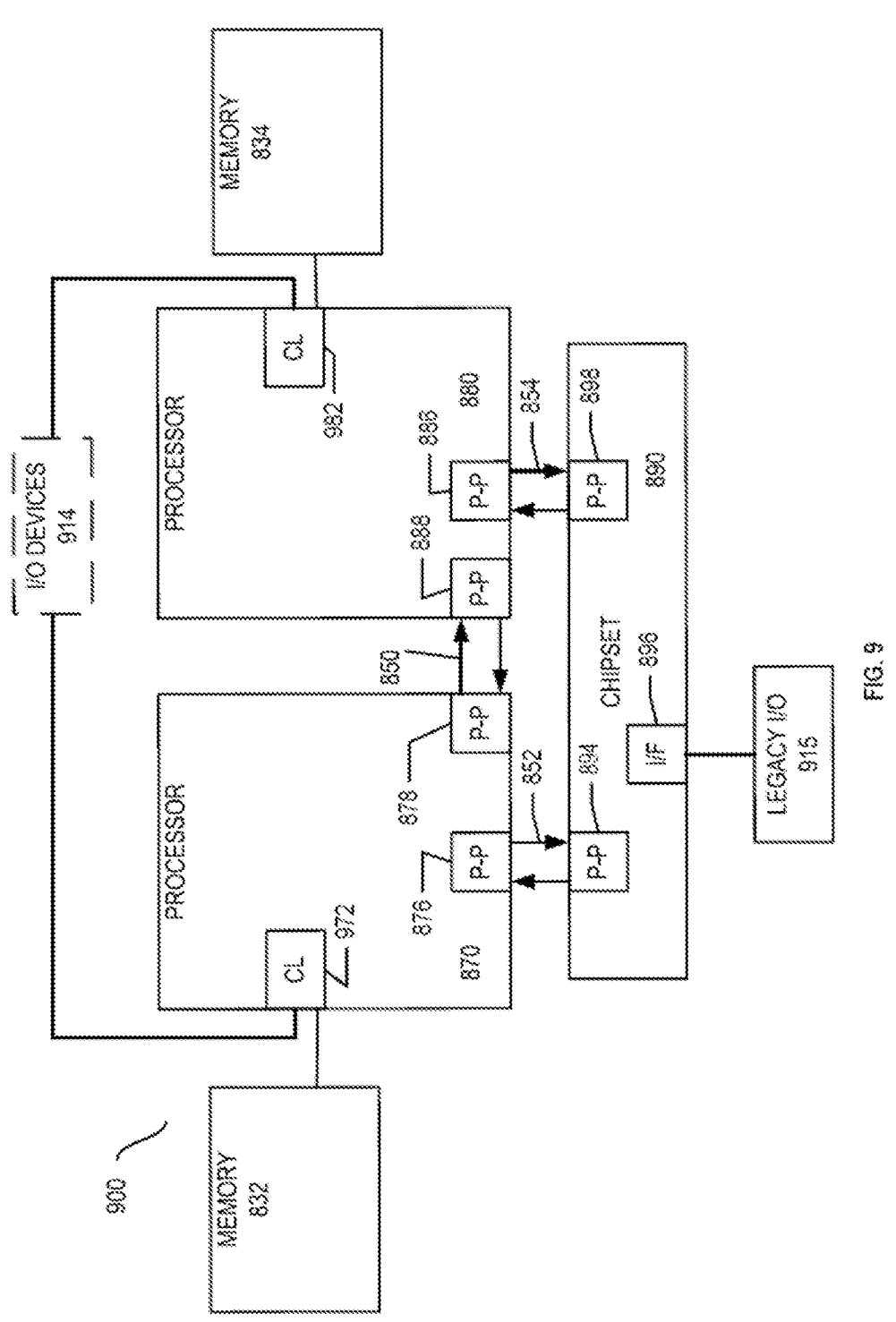
FIG. 9 illustrates a block diagram of a third system in accordance with an embodiment.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 972 and 982, respectively. Thus, the CL 972, 982 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
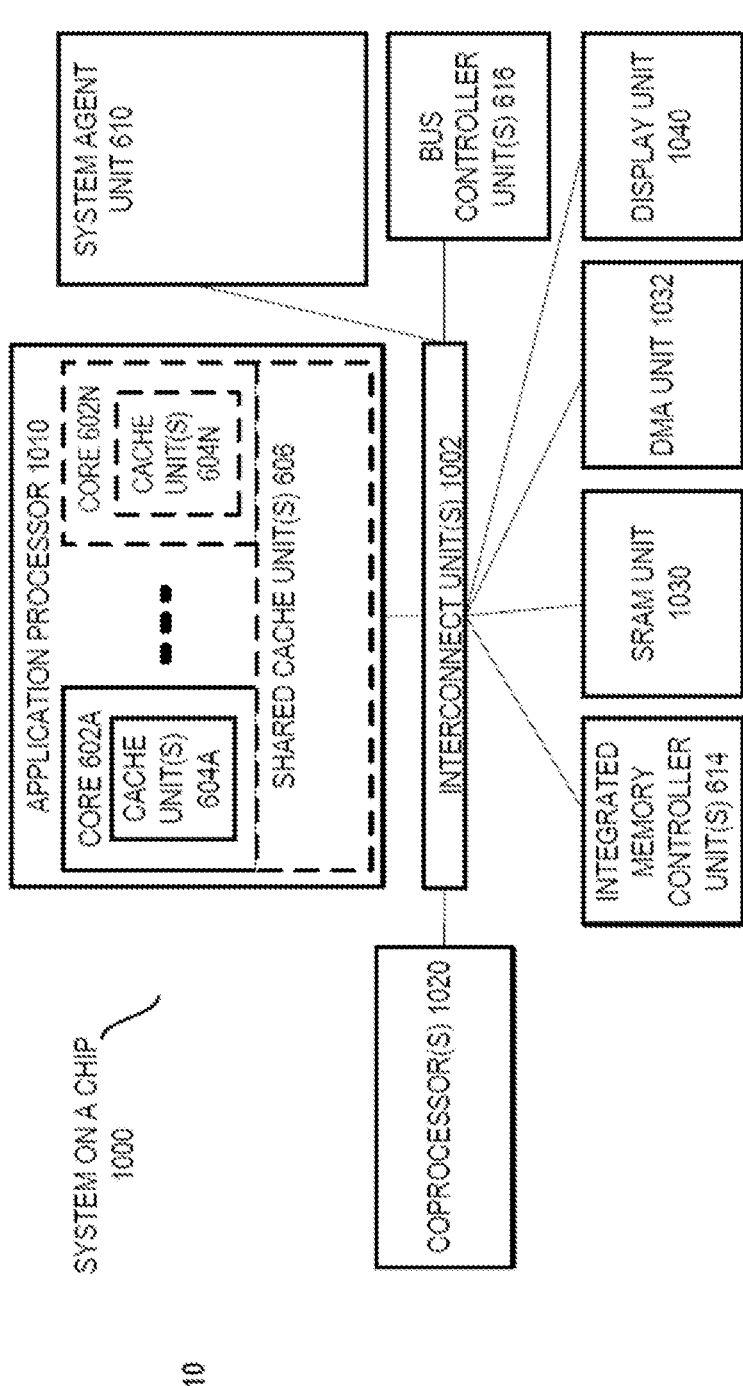
FIG. 10 illustrates a block diagram of a system on a chip (SoC) in accordance with an embodiment.

Referring now to FIG. 10, shown is a block diagram of a SoC 1000 in accordance with an embodiment of the present invention. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 102A-N, cache units 604A-N, and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
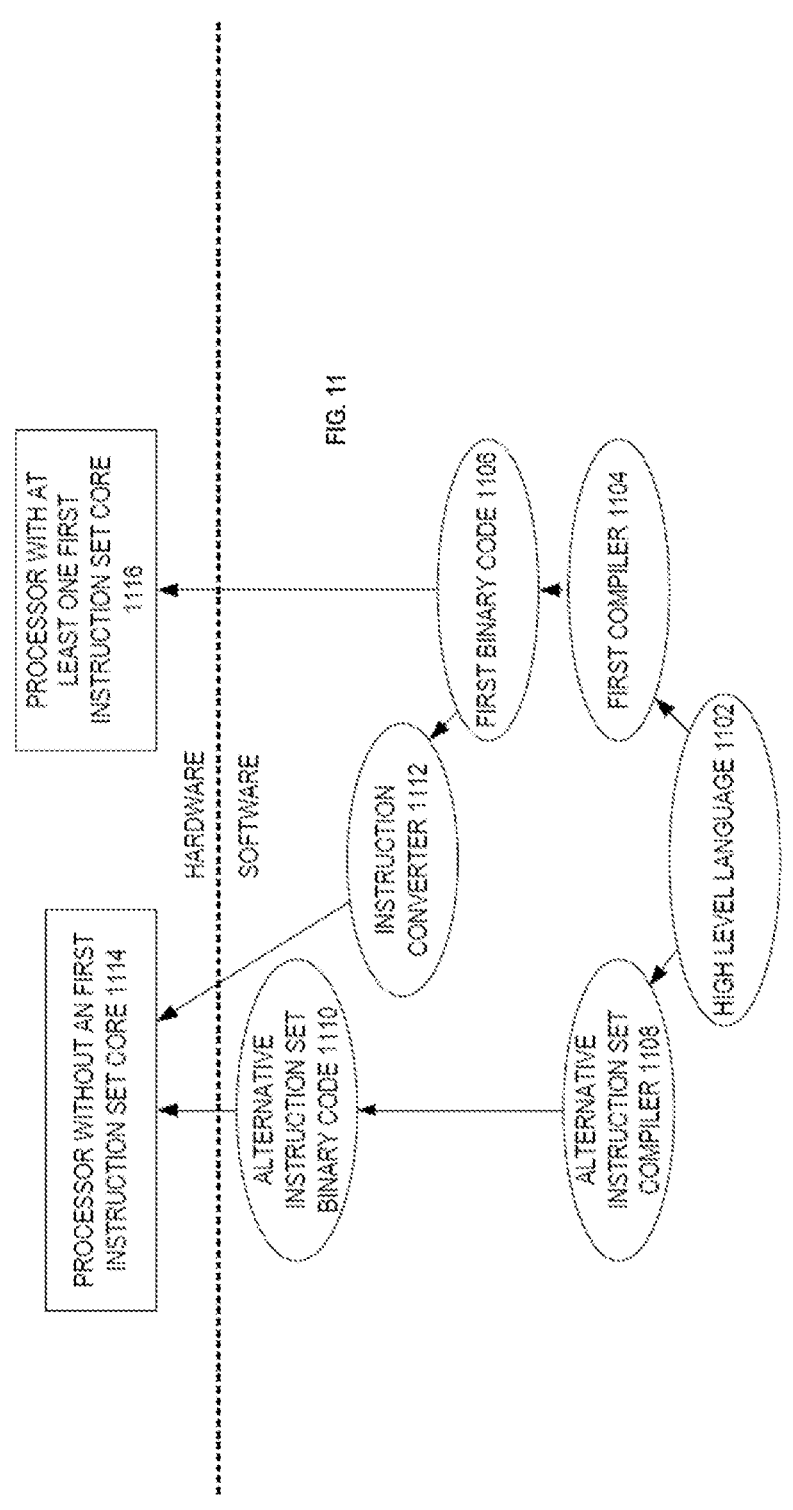
FIG. 11 illustrates a block diagram contrasting the use of a software instruction converter to convert binary instructions in a source instruction set to binary instructions in a target instruction set according to embodiments.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high-level language 1102 may be compiled using a first compiler 1104 to generate a first binary code (e.g., x86) 1106 that may be natively executed by a processor with at least one first instruction set core 1116. In some embodiments, the processor with at least one first instruction set core 1116 represents any processor that may perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1104 represents a compiler that is operable to generate binary code of the first instruction set 1106 (e.g., object code) that may, with or without additional linkage processing, be executed on the processor with at least one first instruction set core 1116. Similarly, FIG. 11 shows the program in the high level language 1102 may be compiled using an alternative instruction set compiler 1108 to generate alternative instruction set binary code 1110 that may be natively executed by a processor without at least one first instruction set core 1114 (e.g., a processor with cores that execute the MIPS instruction set of MIPS Technologies of Sunnyvale, CA and/or that execute the ARM instruction set of ARM Holdings of Sunnyvale, CA). The instruction converter 1112 is used to convert the first binary code 1106 into code that may be natively executed by the processor without a first instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have a first instruction set processor or core to execute the first binary code 1106.

Example Embodiments

In embodiments, an apparatus includes quality-of-service prediction circuitry and a resource controller. The quality-of-service prediction circuitry is to make quality-of-service predictions using a model based at least in part on at least one performance counter measurements and at least one quality-of-service measurement. The resource controller is to allocate one or more shared resources based on the quality-of-service predictions and architectural performance counter measurements.

Any such embodiments may include any or any combination of the following aspects. The resource controller is to allocate the one or more shared resources based on the quality-of-service predictions instead of quality-of-service measurements. The quality-of-service prediction circuitry is to make the quality-of-service predictions using the model based at least in part on at least one performance counter measurement and at least one quality-of-service measurement collected during a model training phase. The resource controller is to allocate the one or more shared resources based on the quality-of-service predictions and architectural performance counter measurements collected during a model update phase in which the model is to be updated. The resource controller is to allocate the one or more shared resources based on a first control loop. The model is to be updated based on a second control loop separate from the first control loop. The one or more shared resources includes memory bandwidth. The one or more shared resources includes core frequency. The model is a reinforcement learning model.

In embodiments, a method includes collecting at least one performance counter measurement and at least one quality-of-service measurement; predicting quality-of-service using a model based at least in part on the at least one performance counter measurement and the at least one quality-of-service measurement; and allocating one or more shared resources based on the quality-of-service predictions and architectural performance counter measurements.

Any such embodiments may include any or any combination of the following aspects. Allocating the one or more shared resources is based on the quality-of-service predictions instead of quality-of-service measurements. Collecting at least one performance counter measurement and at least one quality-of-service measurement is during a model training phase. Allocating one or more shared resources based on the quality-of-service predictions and performance counter measurements is during a model update phase. The method also includes collecting performance counter measurements and quality-of-service measurements during the model update phase, and updating the model during the model update phase using the performance counter measurements and quality-of-service measurements collected during the model update phase. Allocating the one or more shared resources is based on a first control loop. Updating the model is based on a second control loop separate from the first control loop. The one or more shared resources includes memory bandwidth. The one or more shared resources includes core frequency. The model is a reinforcement learning model.

In embodiments, a system to execute a high-priority workload and a best-effort workload includes quality-of-service prediction circuitry and a resource controller. The quality-of-service prediction circuitry is to make quality-of-service predictions using a model based at least in part on at least one performance counter measurements and at least one quality-of-service measurement to be collected during execution of the high-priority workload. The resource controller is to allocate one or more shared resources based on the quality-of-service predictions and architectural performance counter measurements.

Any such embodiments may include any or any combination of the following aspects. The resource controller is to allocate the one or more shared resources based on the quality-of-service predictions instead of quality-of-service measurements. The quality-of-service prediction circuitry is to make the quality-of-service predictions using the model based at least in part on at least one performance counter measurement and at least one quality-of-service measurement collected during a model training phase. The resource controller is to allocate the one or more shared resources based on the quality-of-service predictions and architectural performance counter measurements collected during a model update phase in which the model is to be updated. The resource controller is to allocate the one or more shared resources based on a first control loop. The model is to be updated based on a second control loop separate from the first control loop. The one or more shared resources includes memory bandwidth. The one or more shared resources includes core frequency. The model is a reinforcement learning model.

In embodiments, an apparatus may include means for performing any function disclosed herein. In embodiments, an apparatus may include a data storage device that stores code that when executed by a hardware processor or controller causes the hardware processor or controller to perform any method or portion of a method disclosed herein. In embodiments, an apparatus may be as described in the detailed description. In embodiments, a method may be as described in the detailed description. In embodiments, a non-transitory machine-readable medium may store instructions that when executed by a machine causes the machine to perform any method or portion of a method disclosed herein. Embodiments may include any details, features, etc. or combinations of details, features, etc. described in this specification.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures may be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:

at least one architectural performance counter;

quality-of-service prediction circuitry to make quality-of-service predictions using a model based at least in part on at least one architectural performance counter measurement collected during a first phase of execution of a workload and at least one quality-of-service measurement collected during the first phase of execution of the workload; and a resource controller to allocate one or more shared resources based on the quality-of-service predictions, instead of quality-of-service measurements collected during a second phase of execution of the workload, and at least one architectural performance counter measurement collected during the second phase of execution of the workload.

2. The apparatus of claim 1, wherein the first phase is a model training phase.

3. The apparatus of claim 1, wherein the second phase is a model update phase in which the model is to be updated.

4. The apparatus of claim 1, wherein the resource controller is to allocate the one or more shared resources based on a first control loop and the model is to be updated based on a second control loop separate from the first control loop.

5. The apparatus of claim 1, wherein the one or more shared resources includes memory bandwidth.

6. The apparatus of claim 1, wherein the one or more shared resources includes core frequency.

7. The apparatus of claim 1, wherein the model is a reinforcement learning model.

8. A method comprising:

collecting, by an architectural performance counter in a hardware processor during a first phase of execution of a workload, at least one architectural performance counter measurement and at least one quality-of-service measurement;

predicting, by quality-of-service prediction circuitry in the hardware processor, quality-of-service using a model based at least in part on the at least one architectural performance counter measurement and the at least one quality-of-service measurement; and allocating, by a resource controller in the hardware processor, one or more shared resources based on the quality-of-service predictions, instead of quality-of-service measurements collected during a second phase of execution of the workload, and at least one architectural performance counter measurement collected during a second phase of execution of the workload.

9. The method of claim 8, wherein the first phase is a model training phase.

10. The method of claim 8, wherein the second phase is a model update phase, the method further comprising:

collecting performance counter measurements and quality-of-service measurements during the model update phase; and updating the model during the model update phase using the performance counter measurements and quality-of-service measurements collected during the model update phase.

11. The method of claim 8, wherein allocating the one or more shared resources is based on a first control loop and updating the model is based on a second control loop separate from the first control loop.

12. The method of claim 8, wherein the one or more shared resources includes memory bandwidth.

13. The method of claim 8, wherein the one or more shared resources includes core frequency.

14. The method of claim 8, wherein the model is a reinforcement learning model.

15. A system to execute a high-priority workload and a best-effort workload, the system comprising:

at least one architectural performance counter;

quality-of-service prediction circuitry to make quality-of-service predictions using a model based at least in part on at least one architectural performance counter measurement to be collected during a first phase of execution of the high-priority workload and at least one quality-of-service measurement to be collected during execution of the first phase of the high-priority workload; and a resource controller to allocate one or more shared resources based on the quality-of-service predictions, instead of quality-of-service measurements collected during a second phase of execution of the workload, and at least one architectural performance counter measurement collected during the second phase of execution of the workload.

16. The system of claim 15, wherein the one or more shared resources includes memory bandwidth.

17. The system of claim 15, wherein the one or more shared resources includes core frequency.

* * * * *